(12) United States Patent
Castro et al.

(10) Patent No.: US 7,707,590 B2
(45) Date of Patent: Apr. 27, 2010

(54) COMPUTER SYSTEM AND METHOD FOR PROVIDING ROBUST FILE SYSTEM INFORMATION FOR NON-NATIVE FILE SYSTEM DEVICES

(75) Inventors: Alexander Castro, Issaquah, WA (US); Oliver Lee, Redmond, WA (US); Andrew Silverman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1456 days.

(21) Appl. No.: 10/934,091

(22) Filed: Sep. 1, 2004

(65) Prior Publication Data

US 2006/0047706 A1 Mar. 2, 2006

(51) Int. Cl.
G06F 3/00 (2006.01)
G06F 12/00 (2006.01)
(52) U.S. Cl. .................................. 719/327; 707/200
(58) Field of Classification Search ................ 719/310, 719/327; 707/200, 100
See application file for complete search history.

(56) References Cited

U.S. PATENT DOCUMENTS

| | | | | |
|---|---|---|---|---|
| 5,940,838 | A * | 8/1999 | Schmuck et al. | 707/200 |
| 6,356,971 | B1 * | 3/2002 | Katz et al. | 710/301 |
| 2001/0014894 | A1 * | 8/2001 | Han et al. | 707/202 |
| 2003/0156202 | A1 * | 8/2003 | van Zee | 348/222.1 |

OTHER PUBLICATIONS

Feng, L.-C., and R.-C. Chang, "Using Asynchronous Writes on Metadata to Improve File System Performance," *J. Systems Software* 35:43-54, 1996.
Huizinga, D.M., and C. Ames, Mobile File System Support With Virtual Device Drivers, *Proceedings of the 1999 14th ACM Symposium on Applied Computing*, San Antonio, Tex., Feb. 28-Mar. 2, 1999, pp. 373-381.
Lee, Y.K., et al., "Metadata Management of the SANtopia File System," *Proceedings of the 8th International Conference on Parallel and Distributed Systems*, Kyongju City, So. Korea, Jun. 26-29, 2001, pp. 492-499.
Xu, Y., et al., "Research of the Mobile-Code-Based File System for Portable Information Device," *Proceedings of 2001 International Conference on Computer Networks and Mobile Computing*, Los Alamitos, Calif., Oct. 16-19, 2001, pp. 441-445.

* cited by examiner

*Primary Examiner*—Sough Hyung
*Assistant Examiner*—Lechi Truong
(74) *Attorney, Agent, or Firm*—Shook, Hardy & Bacon L.L.P.

(57) ABSTRACT

An embodiment of the invention is directed to providing robust file system information for non-native devices. In operation, a file system includes both a file storage area for providing access to the contents of files, and a metadata store. The metadata store stores metadata associated with each file or device. When a device is connected to the file system, metadata for that device, and its items, is generated and stored in the metadata store. The metadata persists within the metadata store when the device is disconnected from, or no longer available to, the file system.

14 Claims, 6 Drawing Sheets

COMPUTER SYSTEM AND METHOD FOR PROVIDING ROBUST FILE SYSTEM INFORMATION FOR NON-NATIVE FILE SYSTEM DEVICES

FIELD OF THE INVENTION

The present invention relates to computer system file systems, and more particularly, to providing robust file system information for non-native file system devices attached to the computer system.

BACKGROUND OF THE INVENTION

As computers have become more powerful and sophisticated, they have been used to connect to certain devices that do not necessarily support a computer's file system functions, or that are not necessarily intended to be part of a computer's file system at all. For example, audio compact discs (CDs) were designed and developed to be played in a compact disc player, not in a computer system. However, most modern computers are equipped to read and play the music/data from an audio CD. Likewise, digital cameras are not typically viewed as computer system devices, yet digital cameras can be easily connected to most modern computers and the images stored on the camera can be read, written to, or deleted.

Computer file systems have traditionally been organized in a hierarchical structure. Generally, the hierarchical structure has at its source a root node (often identified as the computer system node), several devices or drives underneath the root node, and under each device or drive, a series of folders, subfolders, and files. The hierarchical file system's longevity is, in part, attributable to its ability to provide organization for files. However, many tasks that involve files distributed across multiple folders or devices do not find a hierarchical organization that easy to use.

FIGS. 1A and 1B are exemplary pictorial diagrams of typical, hierarchical computer file systems. As shown in FIG. 1A, the root node 102, corresponding to the computer system, includes three devices, namely a removable media drive 104, a hard drive 106, and CD-ROM drive 108. Of course, those skilled in the art will appreciate that the illustrated file system 100 is merely a user interface representation of an actual file system within the computer system.

As is typical with user interface representations of file systems, some of the information, i.e., subfolders or files, under a device or folder may be selectively hidden or displayed. For example, the box 120 showing a "+" is a visual indicator there is more information (either a file or subfolder) under the removable media drive 104. Usually, clicking on the box 120 reveals the hidden contents. Box 122, displaying a "−", indicates that information on the level directly below the top level of the hard drive 106 are displayed, i.e., not hidden. Similarly, folder 110 is displaying its contents, including items 114-118, and folder 112 also is displaying its contained items.

As those skilled in the art will appreciate, when a user adds a device to the file system, or when a user inserts removable media into an existing device, such as adding a CD-ROM disc 134 to the CD-ROM drive 108, most file systems read the information on the media or device and dynamically expand the file system accordingly. Thus, as shown in FIG. 1B, when the CD-ROM disc 134 is inserted into the CD-ROM drive 108, the file system 100 displays the stored contents 124 of the CD-ROM disc, particularly files/items 126-130.

As mentioned above, due to their hierarchical organization, hierarchical file systems do not always lend themselves to various multi-file operations. Some of these operations include searching through files distributed in the hierarchy for common aspects. However, at least one emerging file system addresses such inefficiencies. In particular, Microsoft Corporation has announced a hybrid type file system, referred to as the WinFS file system, that combines a traditional hierarchical system with a database-like storage for the files. More specifically, while a hierarchical representation can be maintained to a user, if desired, the underlying file storage of WinFS operates more like a database of files/items. FIGS. 2A and 2B are pictorial diagrams illustrating aspects of a hybrid file system 200, such as the WinFS file system. As shown in FIG. 2A, the hybrid file system 200 includes a file storage area 202. Files, links, folders, subfolders, as well as most other information stored by a file system are found in the file storage area 202. As shown in FIG. 2A, the file storage area 202 contains various items, including item A 206, item B 208, item C 210, and item D 212. For illustration simplicity, it should be understood that items is a general term that may correspond to devices, drives, folders, subfolders, links, files, and the like that are stored by a file system.

As shown in FIG. 2A, the hybrid file system 200 also includes a metadata store 204. As the name suggests, the metadata store stores metadata corresponding to items in the file's storage area 202. As illustrated, each item in the file storage area has a corresponding metadata entry in the metadata store 204. Items 206-212 have corresponding entries in the metadata store, in particular, metadata items 214-220. As those skilled in the art will recognize, generally speaking, metadata is information about an item, but not the item itself. For example, with regard to an audio file, metadata corresponding to the audio file may describe the sampling rate of the file, the size of the file, the artist that created the work contained in the audio file, as well as numerous other aspects related to the audio file that are not part of the file itself.

The metadata stored in the metadata store 204 is usually not provided with the stored item, but must be generated by the file system when the file is added or modified. Generating metadata typically requires substantial computing time. Fortunately, most files are not constantly modified and the computer system can generate metadata for the files during computational idle times in a background process. However, to generate metadata, the metadata generator process typically requires that the item be present and readily accessible so that it can be examined and analyzed to generate the metadata. This presents a problem, however, when the item is on removable media, or when the item is on a device that does not support typical file system commands, such as a broadcasted data stream. For example, with reference to FIG. 2B, if item E 222 is added when removable media is inserted into a removable media drive, the file system 200 will add it into the file storage area 202, but may not be able to generate and store metadata corresponding to the item. In other words, for various reasons, the metadata generator process may not always be able to access an item in the background to generate the metadata.

In light of the above-described issues found in the prior art, what is needed is a system and method for providing robust file system information for items on non-native file system devices, and in particular, providing metadata for items on or from non-native file system devices. The present invention addresses these and other issues found in the prior art.

SUMMARY OF THE INVENTION

In accordance with aspects of the present invention, a method for providing robust file system information for non-native devices, as well as items available via the non-native devices, connected to a computer system, is presented. A device is detected as being connected to the computer system. A determination is made as to whether the device is a non-native device to the file system. If the device is a non-native device, a proxy is added to the file system for the device, and metadata for the device is generated and stored in a metadata store.

In accordance with further aspects of the present invention, a computer-readable medium bearing computer-executable instructions which, when executed on a computer system, carry out a method for providing robust file system information for non-native devices, as well as items available via the non-native devices, is presented. During execution, a device is detected as being connected to the computer system. A determination is made as to whether the device is a non-native device to the file system. If the device is a non-native device, a proxy is added to the file system for the device, and metadata for the device is generated and stored in a metadata store.

In accordance with yet further aspects of the present invention, a file system, operating on a computer system, for providing robust information for non-native devices and items available via the non-native devices, is presented. The file system includes a storage area and a corresponding metadata store. The metadata store stores metadata associated with files and devices identified in the file storage area. The file system, upon detecting that a device has been connected to the computer system, determines whether the device is a non-native device. If the device is a non-native device, the file system adds a proxy to the file system for the device, generates metadata for the device, and stores the metadata for the device in the metadata store.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1B:
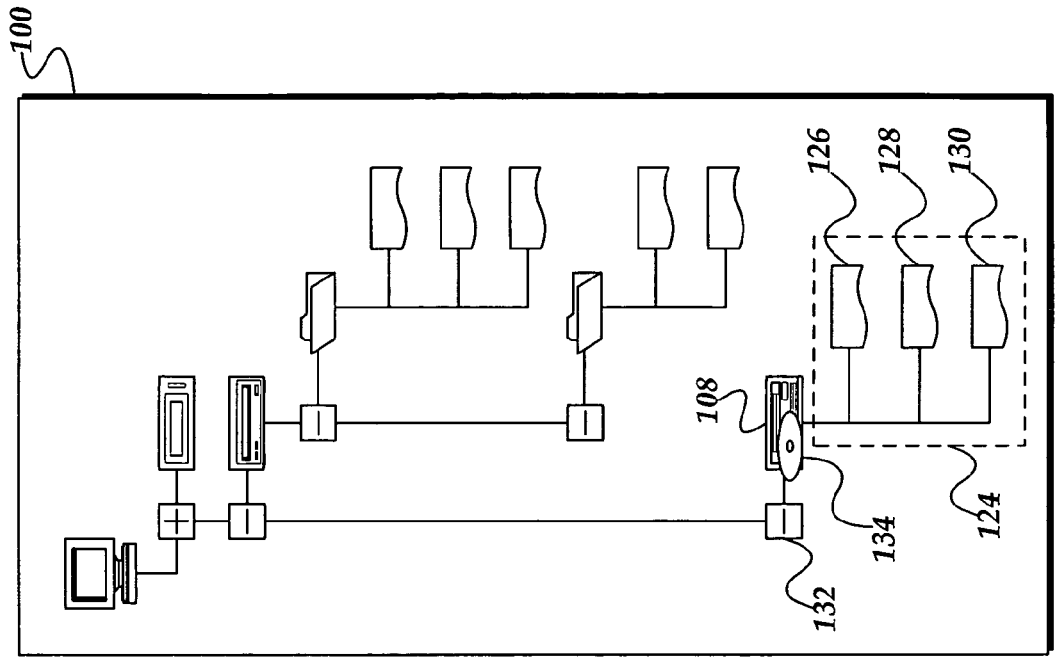
FIGS. 1A and 1B are pictorial diagrams illustrating an exemplary user interface showing a typical, hierarchical computer file system, as found in the prior art.
Figure 1A:
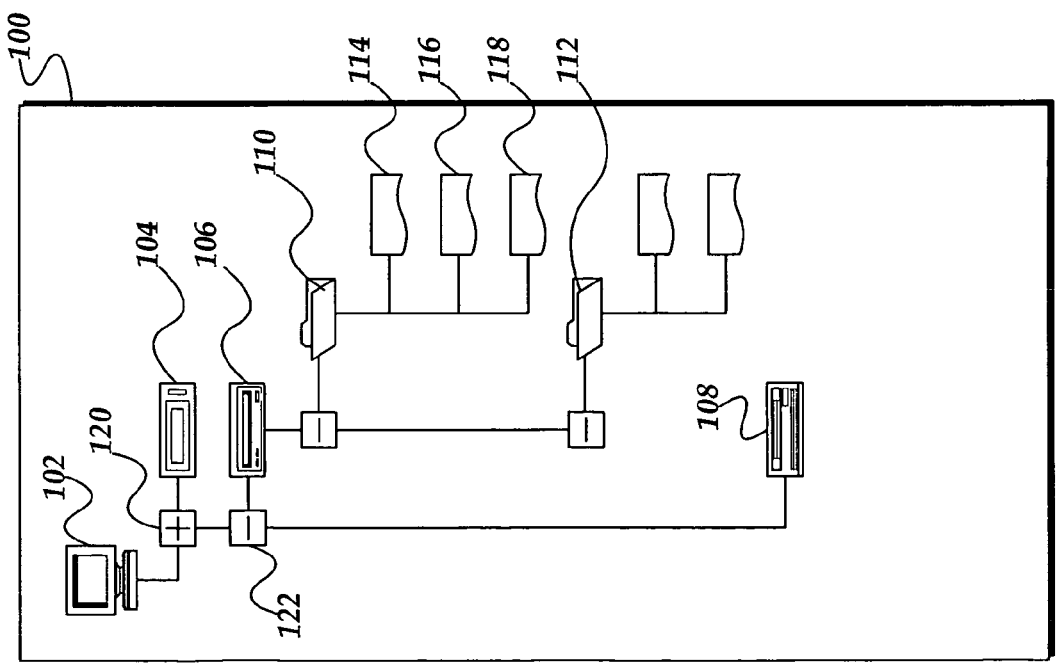
Figure 2A:
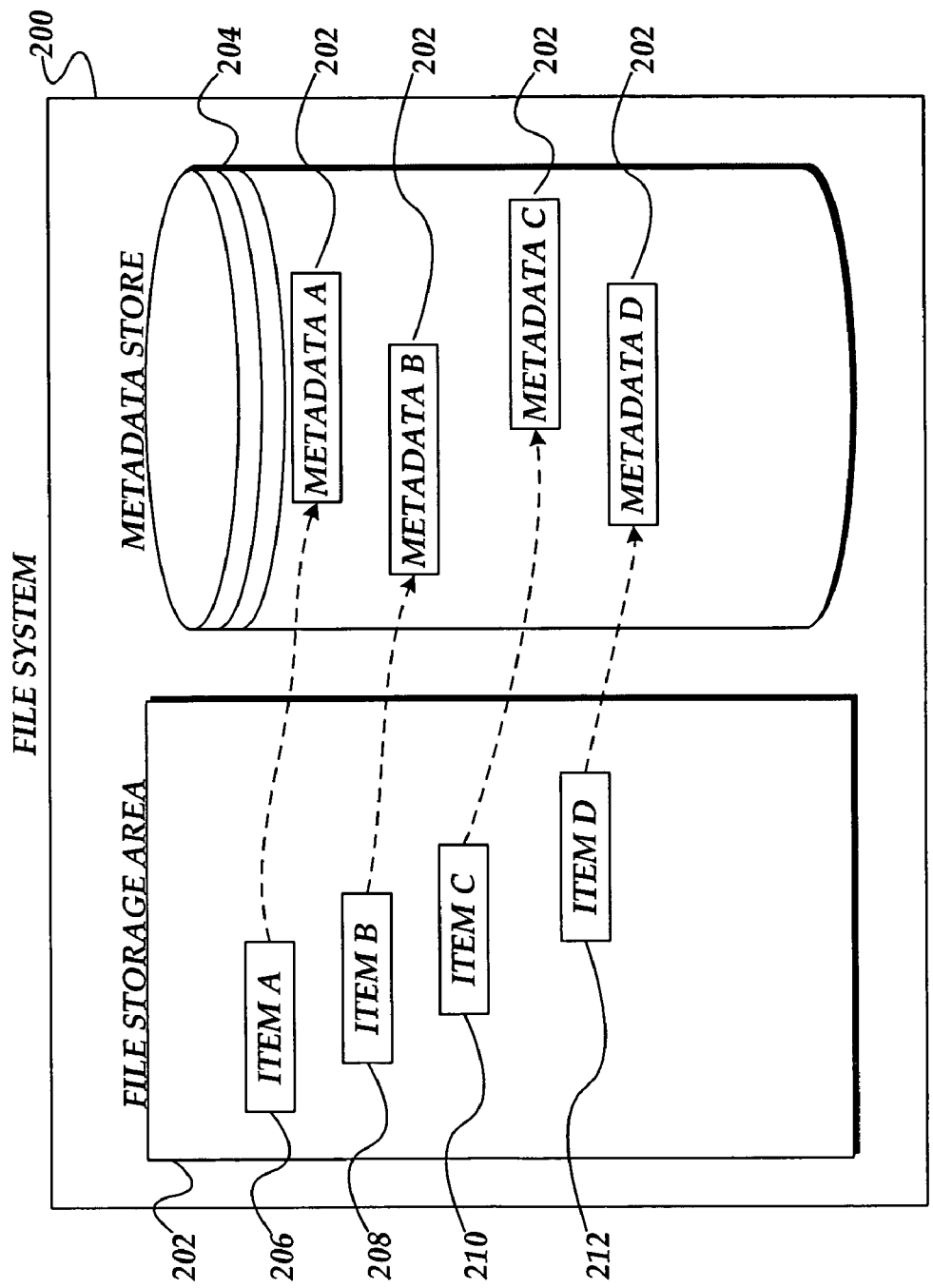
FIGS. 2A and 2B are pictorial diagrams illustrating aspects of a hybrid file system.
Figure 2B:
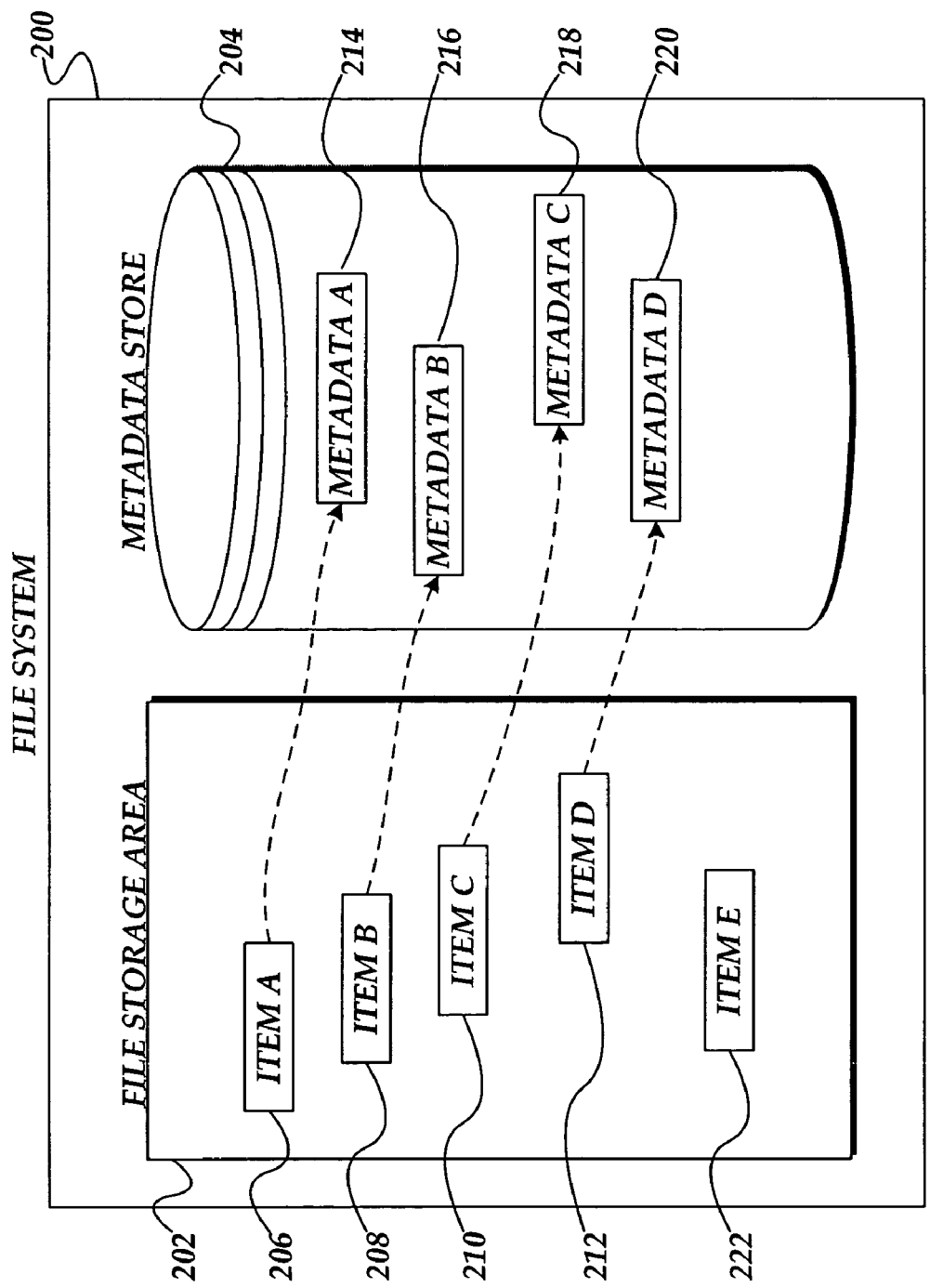
Figure 3A:
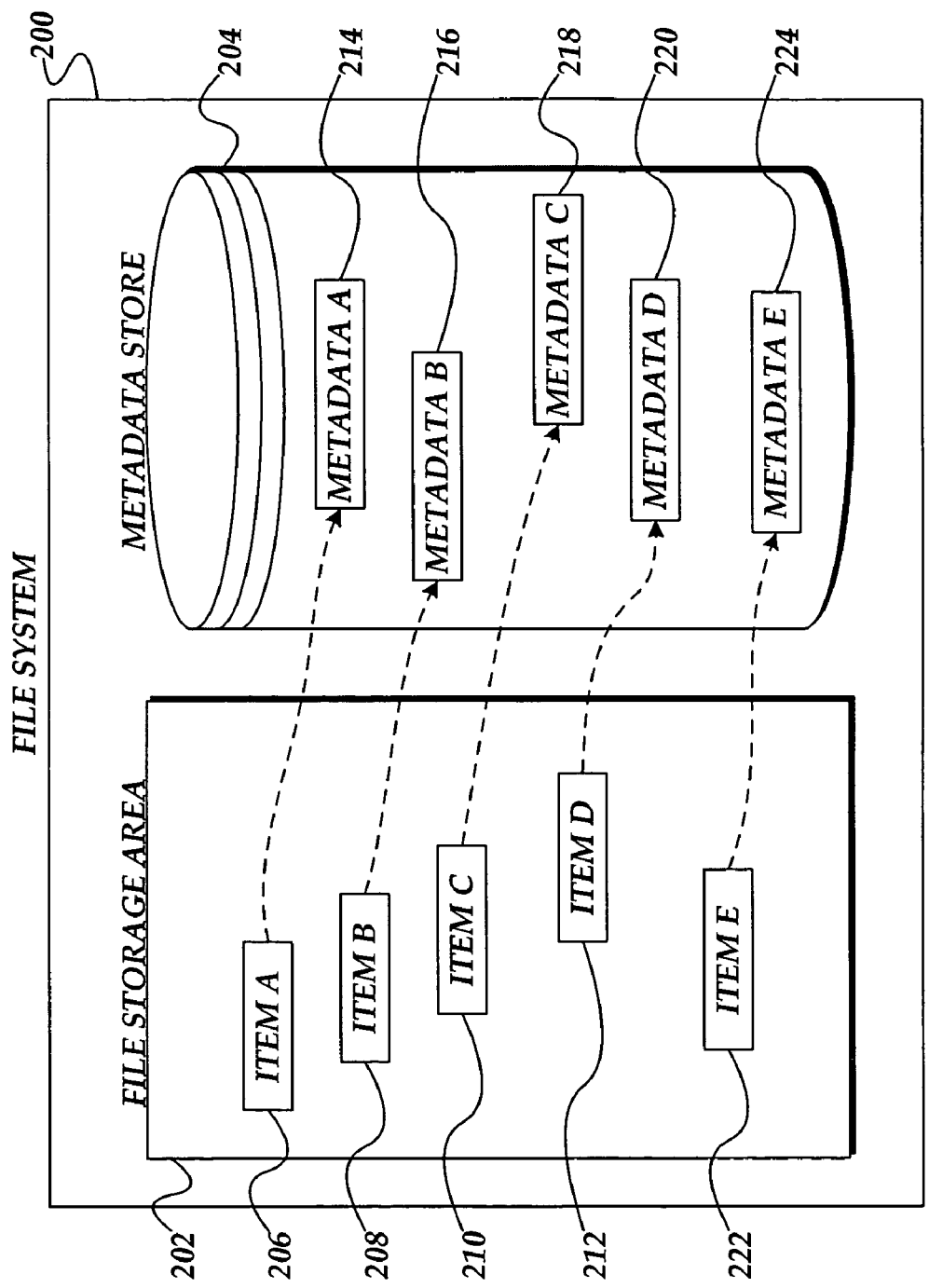
FIGS. 3A and 3B are pictorial diagrams illustrating aspects of a hybrid file system adapted according to aspects of the present invention.
Figure 3B:
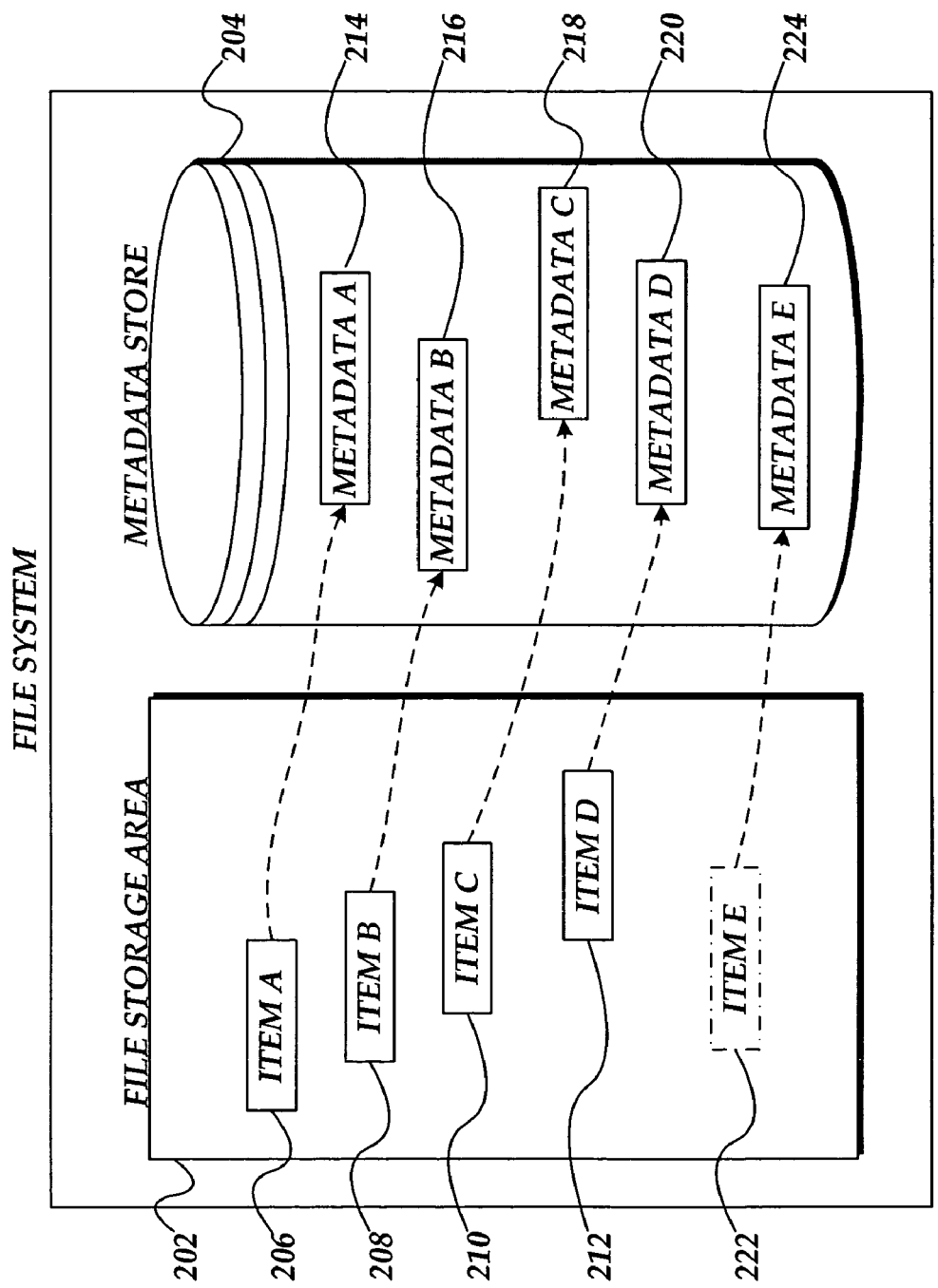

As mentioned above, according to aspects of the present invention, as an item on a non-native file system device (or the non-native file system device itself) is added to a hybrid file system, metadata is immediately generated for the item and stored in metadata store. FIGS. 3A and 3B are pictorial diagrams illustrating aspects of a hybrid file system adapted according to aspects of the present invention. Thus, as shown in the exemplary hybrid file system 200, as item E 222, located on a non-native file system device or removable medium, is first added to the hybrid file system, metadata is immediately generated for the item and stored in the metadata store 204, as indicated by metadata E 224.

As those skilled in the art will appreciate, quite frequently, non-native file system devices or items are only temporarily connected to the computer system. Thus, while the computer system takes an initial 'hit' in generating metadata for the item when it is first added to the file system, according to aspects of the present invention, when that item is removed or no longer available in the file storage area 202 (e.g., because the device upon which it resides has been disconnected from the computer system, or the item was only temporarily available on the device), the exemplary hybrid file system 200 retains a proxy 5 for the item in the file storage area 202 and the metadata store 204 retains the corresponding metadata. Thus, as shown in FIG. 3B, while item E 222 is no longer available to the hybrid file system, the file storage area 202 retains a proxy for the item, as indicated by proxy E 222 drawn in dashed lines, and retains the generated metadata in the metadata store 204. Proxies and metadata are retained for a number of reasons, including the fact that 10 items are frequently 'reattached' to the file system, or a user may wish to search the metadata of that item while it is not connected to the computer system.

Figure 4:
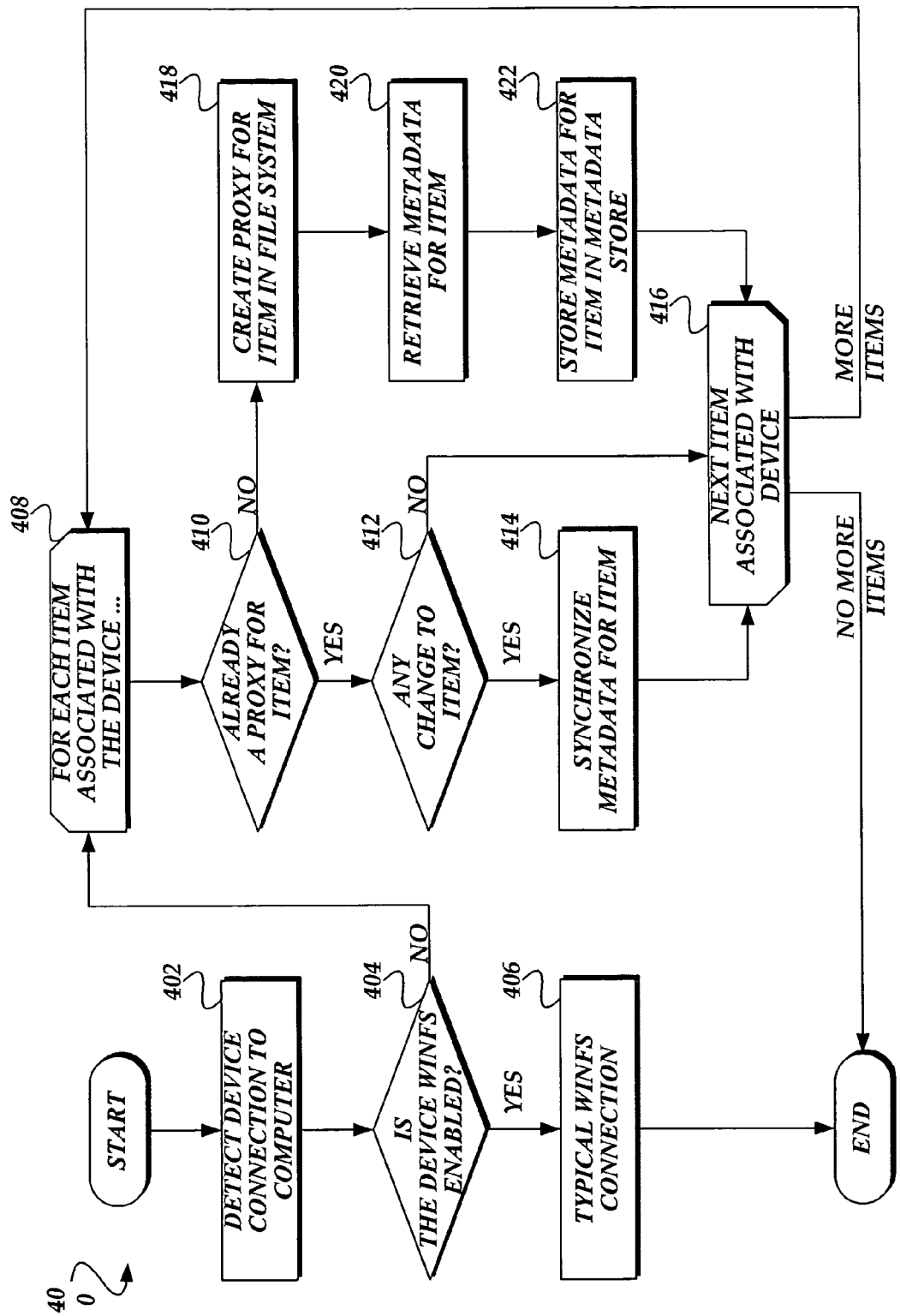
FIG. 4 is a flow diagram illustrating an exemplary routine for providing robust file system information for non-native file system devices.

FIG. 4 is a flow diagram illustrating an exemplary routine for providing robust file system information on a hybrid file system for non-native file system devices. This routine 400 is generally initiated when an device (or item) is added to the file system. Beginning at block 402, the file system detects that a device is connected to the computer system. At decision block 404, a determination is made as to whether the connected device is a native file system device. A device is a native file system device when it is designed to support file system operations.

If the device is a native file system device, at block 406, the typical file system operations to add the item to the file system, including putting the entry into the file system store, are performed. Thereafter, the routine 400 terminates.

Alternatively, if the added device is a non-native file system device, at looping block 408, a loop begins to process each item stored on the non-native file system device for access by the file system.

As mentioned above, even when an item is removed, a proxy and metadata for that item are retained by the file system. Thus, when that item is reconnected to the file system, if no information regarding the item has changed, the file system need not re-generate any metadata for the item. Accordingly, as shown in FIG. 4, at block 410, a determination is made as to whether a proxy (and corresponding metadata) for the item already exists within the file system. If a proxy for the item already exists in the file system, at decision block 412, another determination is made as to whether there were any changes to the item while it was disconnected from the file system. If there was a change to the item, at block 414, the metadata corresponding to that item stored in the metadata store 204, as well as any proxy information that is out of sync, is updated. Thereafter, or if, at decision block 412, there was no change to the item, the routine 400 proceeds to loop block 416. At loop block 416, if there are more items on the connected device to be processed, the next item is selected and the routine returns to loop block 408 for processing that item. Alternatively, if there are no more items to be processed, the routine 400 terminates.

At decision block 410, if a proxy does not already exist in the file system, the routine 400 proceeds to block 418. At block 418, a proxy is created in the hybrid file system for the item. At block 420, metadata for the item is generated, and at block 422, the metadata is stored in the metadata store. Thereafter, the routine 400 proceeds to loop block 416. At loop block 416, if there are more items on the connected device to be processed, the next item is selected and the routine returns to loop block 408 for processing that item. Alternatively, if there are no more items to be processed, the routine 400 terminates.

While various embodiments, include the preferred embodiment, of the invention have been illustrated and described, it will be appreciated that various changes can be made therein without departing from the spirit and scope of the invention.

The embodiments of the invention in which an exclusive property or privilege is claimed are defined as follows:

1. A method for providing robust file system information for non-native devices, as well as items available via the non-native devices, connected to a computer system, the method comprising:
   detecting that a device has been connected to the computer system;
   determining whether the device is a non-native device, wherein the non-native device is a device that does not support the computer system's file system functions, and if so:
   adding a proxy to the file system for the device;
   generating metadata for the device;
   storing the metadata for the device in a metadata store associated with the file system; and
   for each item available via the device:
      determining whether a proxy for the item already exists in the file system, and if a proxy does not already exist:
      adding a proxy to the file system for the item;
      generating metadata regarding the item; and
      storing the metadata for the item in the metadata store;
      if a proxy does already exist, determining whether any changes have occurred to the item from the device's previous connection to the computer system; and if so, generating updated metadata for the item and storing the updated metadata in the metadata store as the item's metadata;
   detecting that the device has been disconnected from the computer system;
   indicating, via the proxy, that the device has been disconnected; and
   maintaining the metadata for the device in the metadata store.

2. The method of claim 1 further comprising, if the device is a non-native device:
   for each item available via the device:
   adding a proxy to the file system for the item;
   generating metadata regarding the item;
   storing the metadata for the item in the metadata store.

3. The method of claim 1 further comprising generating metadata regarding the device and storing the metadata for the device in the metadata store only if a proxy for the device does not already exist in the file system.

4. The method of claim 3 further comprising, if a proxy for the device already exists in the file system:
   determining whether any changes have occurred to the device from its previous connection to the computer system; and if so
   generating updated metadata for the device and storing the updated metadata in the metadata store as the device's metadata.

5. The method of claim 1, wherein the file system is Microsoft Corporation's WinFS file system.

6. The method of claim 1, wherein the file system is Microsoft Corporation's WinFS file system.

7. A computer readable computer-executable instructions which, when executed on a computer system, carry out a method for providing robust file system information for non-native devices, as well as items available via the non-native devices, the method comprising:
   detecting that a device has been connected to the computer system;
   determining whether the device is a non-native device, wherein the non-native device is a device that does not support the computer system's file system functions, and if so:
   adding a proxy to the file system for the device, wherein the proxy remains on the file system for the device after the device has been disconnected from the computer system;
   generating metadata for the device; and
   storing the metadata for the device in a metadata store associated with the file system; and
   for each item available via the device:
      determining whether a proxy for the item already exists in the file system, and if a proxy does not already exist:
      adding a proxy to the file system for the item;
      generating metadata regarding the item; and
      storing the metadata for the item in the metadata store;
      if a proxy does already exist, determining whether any changes have occurred to the item from the device's previous connection to the computer system; and if so, generating updated metadata for the item and storing the updated metadata in the metadata store as the item's metadata.

8. The method of claim 7 further comprising, if a proxy for the item already exists in the file system:
   determining whether any changes have occurred to the item from the device's previous connection to the computer system; and if so
   generating updated metadata for the item and storing the updated metadata in the metadata store as the item's metadata.

9. The method of claim 7 further comprising:
   detecting that the device has been disconnected from the computer system;
   indicating, via the proxy, that the device has been disconnected; and
   maintaining the metadata for the device in the metadata store.

10. The method of claim 7, wherein the file system is Microsoft Corporation's WinFS file system.

11. A computer readable memory storing computer-executable instructions embodied thereon that, when executed, enable a computing device to provide a file system, operating on the computing device, for providing robust information for non-native devices and items available via the non-native devices, the file system comprising:
   a file storage area; and
   a metadata store, wherein the metadata store stores metadata associated with files and devices identified in the file storage area;
   wherein, the file system, upon detecting that a device has been connected to the computer system:

determines whether the device is a non-native device, wherein the non-native device is a device that does not support the computer system's file system functions, and if so:
adds a proxy to the file system for the device, wherein the proxy remains on the file system for the device after the device has been disconnected from the computer system;
generates metadata for the device; and
stores the metadata for the device in the metadata store, wherein the metadata for the device is maintained in the metadata store after the device is disconnected from the computer system; and
for each item available via the device:
  determines whether a proxy for the item already exists in the file system, and if a proxy does not already exist:
    adds a proxy to the file system for the item;
    generates metadata regarding the item; and
    stores the metadata for the item in the metadata store;
  if a proxy does already exist, determines whether any changes have occurred to the item from the device's previous connection to the computer system; and if so generates updated metadata for the item and storing the updated metadata in the metadata store as the item's metadata.

12. The media of claim 11, wherein if a proxy for the item already exists in the file system, the file system:
determines whether any changes have occurred to the item from the device's previous connection to the computer system, and if so:
generates updated metadata for the item; and
stores the updated metadata in the metadata store as the item's metadata.

13. The media of claim 11, wherein the file system, upon detecting that the device has been disconnected from the file system;
indicates, via the proxy for the device, that the device has been disconnected; and
maintains the metadata for the device in the metadata store.

14. The media of claim 11, wherein the file system is Microsoft Corporation's WinFS file system.

* * * * *